(12) United States Patent
Wong

(10) Patent No.: US 9,674,217 B2
(45) Date of Patent: *Jun. 6, 2017

(54) METHOD AND SYSTEM FOR MITIGATION OF DISTRIBUTED DENIAL OF SERVICE (DDOS) ATTACKS

(71) Applicant: John Wong, Newton, PA (US)

(72) Inventor: John Wong, Newton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/055,209

(22) Filed: Feb. 26, 2016

(65) Prior Publication Data

US 2016/0234249 A1   Aug. 11, 2016

Related U.S. Application Data

(63) Continuation-in-part of application No. 14/270,133, filed on May 5, 2014, now Pat. No. 9,294,483.

(60) Provisional application No. 61/819,489, filed on May 3, 2013.

(51) Int. Cl.
*G06F 21/00* (2013.01)
*H04L 29/06* (2006.01)
*H04L 29/12* (2006.01)

(52) U.S. Cl.
CPC ...... *H04L 63/1458* (2013.01); *H04L 61/1511* (2013.01); *H04L 63/0218* (2013.01); *H04L 63/101* (2013.01); *H04L 63/1416* (2013.01)

(58) Field of Classification Search
CPC combination set(s) only.
See application file for complete search history.

(56) References Cited

U.S. PATENT DOCUMENTS

| | | | |
|---|---|---|---|
| 7,548,945 B2 | 6/2009 | Asnis | |
| 7,849,502 B1* | 12/2010 | Bloch | H04L 12/2602 726/11 |
| 8,209,415 B2 | 6/2012 | Wei | |
| 8,423,672 B2 | 4/2013 | Liu et al. | |
| 2008/0168558 A1 | 7/2008 | Kratzer et al. | |
| 2012/0079592 A1* | 3/2012 | Pandrangi | H04L 47/10 726/22 |
| 2012/0240185 A1* | 9/2012 | Kapoor | H04L 63/1425 726/1 |

FOREIGN PATENT DOCUMENTS

CN    101945041 A    1/2011

OTHER PUBLICATIONS

Ahmed, Ejaz, et al., "Use of IP Addresses for High Rate Flooding Attack Detection", Introduction, pp. 1 and 2, and Detection Algorithm, pp. 6-7, 2010, http://eprints.qut.edu.au/34395/1/c34395.pdf.

* cited by examiner

*Primary Examiner* — Ghazal Shehni
(74) *Attorney, Agent, or Firm* — Cozen O'Connor

(57) ABSTRACT

A system and method for mitigating the effects of malicious internet traffic, including DDOS attacks and email bombs, by utilizing a DNS Traffic Analyzer and Firewall to analyze network traffic intended for a DNS server and preventing some network traffic from accessing the DNS server.

15 Claims, 4 Drawing Sheets

METHOD AND SYSTEM FOR MITIGATION OF DISTRIBUTED DENIAL OF SERVICE (DDOS) ATTACKS

CROSS-REFERENCE TO RELATED APPLICATIONS

This application is a continuation in part of U.S. application Ser. No. 14/270,133, filed May 5, 2014, which claims the benefit of U.S. Provisional Application Ser. No. 61/819,489, filed May 3, 2013, the disclosure content of which is hereby incorporated by reference in its entirety.

BACKGROUND OF THE INVENTION

1. Field of the Invention

The present invention generally relates to the field of internet traffic and, more particularly, to a system and method for controlling internet traffic to mitigate effects of malicious traffic, including distributed denial of service (DDOS) attacks and email bombing attacks, a particular type of DDOS attack.

2. Description of the Related Art

Computers connected via a network, such as the Internet, are identified by a unique identifier. For most computers, which use the Transmission Control Protocol/Internet Protocol (TCP/IP), this unique identifier is called an internet protocol address, or IP address. IP addresses can be static or, more commonly, dynamic.

Generally, a first computer on a network can attempt to access a second computer on the same network directly, via the second computer's IP address. More commonly, the user of a first computer will only know the "name" of the intended destination, not the IP address of the destination. Using the Domain Name System, or DNS, the user of the first computer can access the destination without knowledge of the destination's IP address.

The DNS uses a process called DNS name resolution to find a specific IP address, given a particular domain name. For example, if a user was attempting to access the domain example.com, the user would enter the name into a web browser's address bar, and the DNS would resolve the IP address for that domain.

The DNS has a hierarchical structure and utilizes a large number of DNS servers that store records for a given domain name and respond with answers to queries, such as asking for the IP address for a given domain name.

An authoritative DNS server is a DNS server that gives answers in response to queries for a particular DNS zone. Every domain name appears in a zone that is served by at least one authoritative name server.

If a particular DNS server cannot answer a query, it may query other DNS servers that are higher up in the hierarchy by performing a reverse look-up. The number of DNS servers has grown as use of the Internet has expanded.

Many devices have been developed to protect servers and networks from malicious attacks coming from the Internet. Typically, these devices fall into the category of firewalls and specialized routers. Generally, a firewall is any security system that controls network traffic by applying a set of rules. Essentially, a firewall is a barrier between a secure network and another, unsecure network (i.e., the Internet).

Internet traffic can also be regulated using white lists, black lists, and/or grey lists to manage a set of allowed or denied users. For example, U.S. Pat. No. 7,849,502 and U.S. Patent Application Publication Nos. 2012/0079592 and 2008/0168558 describe the creation, management, and use of various types of white, black, and grey lists.

Each and every reference cited herein is hereby incorporated by reference in its entirety, where appropriate, for teachings of additional or alternative details, features, and/or technical background.

SUMMARY OF THE INVENTION

Embodiments of the present invention relate to the internet, and more particularly to methods and systems for mitigating malicious internet traffic, such as DDOS attacks and in particular, DDOS Email Bombing attacks.

A particular embodiment of the present disclosure is directed to a method and system for mitigation malicious DDOS Email Bombing by affecting the DNS lookup by the malicious sending users and their outbound SMTP servers of the destination email address DNS information, specification the MX record data, using the methods disclosed herein.

Some embodiments of the present invention relate to a system for mitigating malicious network traffic comprising a protected server within a domain, at least one Authoritative DNS server of the domain, and at least one DTAF Firewall, wherein network traffic must pass through the DTAF Firewall(s) before accessing the Authoritative DNS server(s), and wherein the DTAF Firewall(s) analyzes the network traffic attempting to pass through the DTAF Firewall. Some embodiments further comprise a Central Master DTAF, wherein the DTAF Firewall(s) send network traffic data to the Central Master DTAF, and wherein the Central Master DTAF sends at least one access control list to the DTAF Firewall(s).

Some embodiments further comprise a system wherein network traffic must also pass through the DTAF Firewall(s) before accessing the protected server and/or public DNS servers.

Further embodiments comprise a system for mitigating malicious email traffic, comprising: a protected server within a domain or protected email server that receives network traffic, including email traffic; at least one Authoritative Domain Name System (DNS) server of the domain; at least one DNS Traffic Analyzer and Firewall (DTAF), wherein network traffic must pass through the at least one DTAF Firewall before accessing the at least one Authoritative DNS server, and wherein the at least one DTAF Firewall analyzes and collects data from the email traffic attempting to pass through the at least one DTAF Firewall to a protected server; and a Central Master DTAF, wherein the at least one DTAF Firewall sends email traffic data to the Central Master DTAF, and wherein the Central Master DTAF sends at least one access control list to the at least one DTAF Firewall.

Some embodiments further comprise a domain shifting subsystem, wherein the domain shifting subsystem creates New Authoritative DNS servers and reroutes at least some network traffic to the New Authoritative DNS servers.

In a preferred embodiment, the systems described above may also include the features wherein the enhanced and dynamic access control list contains a list of denied IP addresses that are prohibited from passing through to the protected system and allowed IP addresses that are allowed to pass through to the protected system, wherein such allowed and denied IP addresses are based not only upon source address of the attack traffic, but also IP addresses belonging to public and private email servers and email relay servers identified as used by the email attacker(s) to find the target protected system or related mail exchange (MX) servers, such identification done via an analysis of network traffic at the attack target, attack target email server, as well and at distributed DTAF systems that are not under attack, such as public Internet Service Provider (ISP) DNS servers.

Further embodiments of the systems and methods described herein may also include the features wherein the enhanced and dynamic access control list contains a list of restricted IP addresses that are dynamically and selectively allowed to pass through to the protected system based upon list of allowed or disallowed query type, wherein such allowed and denied IP addresses are based not only upon source address of the attack traffic, but also IP addresses belonging to public and private email servers and email relay servers identified as used by the email attacker(s) to find the target protected system or related mail exchange (MX) servers, such identification done via an analysis of network traffic at the attack target, attack target email server, as well and at distributed DTAF systems that are not under attack, such as public Internet Service Provider (ISP) DNS servers.

Some embodiments are directed to methods of mitigating malicious network traffic, comprising the following steps: (1) analyzing network traffic intended for at least one Authoritative Domain Name System (DNS) server or email server; (2) generating network traffic and email relay data; (3) sending the network traffic and email relay data to a Central Master DTAF central system; (4) receiving an access control list from the Central Master DTAF central system; and (5) updating firewall parameters based upon the received access control list.

In some embodiments, the domain shifting subsystem rotates the Authoritative DNS Servers on a regular basis. In some embodiments, new Authoritative DNS server(s) process new network traffic. In other embodiments, only whitelisted traffic is processed by the New Authoritative DNS Server(s). In still other embodiments, only suspicious network traffic is processed by the New Authoritative DNS Server(s).

DETAILED DESCRIPTION OF THE EXEMPLARY EMBODIMENTS

Figure 1:
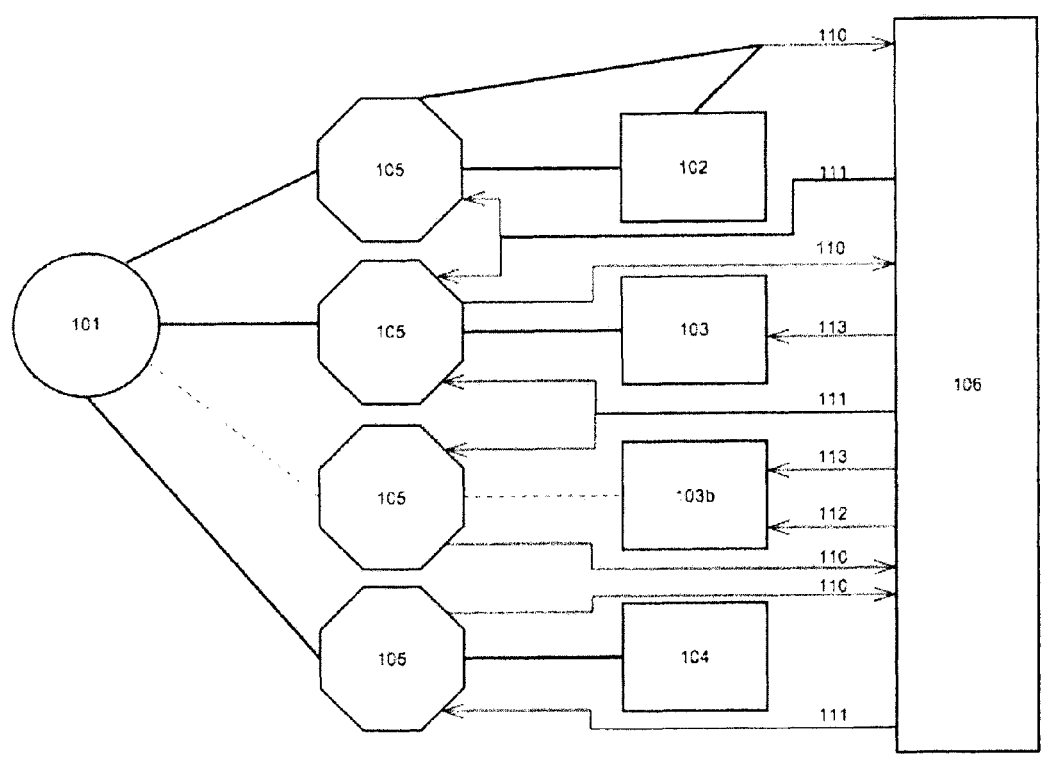
FIG. 1 is a simplified block diagram depicting an embodiment of the invention.

Firewalls and specialized routers may typically utilize source IP detection, packet and content analysis, traffic pattern analysis, and an array policies and rules to filter out malicious traffic and content. Some devices are scalable to handle higher levels of traffic and larger scale malicious attacks.

One type of Internet-based attack is a DDOS attack. Generally, a DDOS attack is an attempt to make a target computer or server unavailable to its intended users by preventing the target from functioning. During a DDOS attack, the attacker(s) generate a large volume of connection attempts directed at the target's IP address or addresses. Commonly, these connection attempts are directed at the target's authoritative DNS servers. The intended result of such a large number of connection attempts is that the target is overloaded such that it is unable to service legitimate connection attempts from valid users.

Some DDOS attacks can be defended via traditional methods such as firewalls. However, in recent years, the scale of some DDOS attacks has become unprecedentedly large and long in duration, and thus requiring additional capabilities to defeat the attack and protect the system under attack.

DDOS attacks come in several different variations. A specific type of DDOS attack is DDOS Email bombing. As appropriately described in Wikipedia:

"In Internet usage, an email bomb is a form of net abuse consisting of sending huge volumes of email to an address in an attempt to overflow the mailbox or overwhelm the server where the email address is hosted in a denial-of-service attack . . .

Mass mailing consists of sending numerous duplicate mails to the same email address. These types of mail bombs are simple to design but their extreme simplicity means they can be easily detected by spam filters. Email-bombing using mass mailing is also commonly performed as a DDOS attack by employing the use of "zombie" botnets; hierarchical networks of computers compromised by malware and under the attacker's control. Similar to their use in spamming, the attacker instructs the botnet to send out millions or even billions of emails, but unlike normal botnet spamming, the emails are all addressed to only one or a few addresses the attacker wishes to flood. This form of email bombing is similar in purpose to other DDOS flooding attacks. As the targets are frequently the dedicated hosts handling website and email accounts of a business, this type of attack can be just as devastating to both services of the host.

This type of attack is more difficult to defend against than a simple mass-mailing bomb because of the multiple source addresses and the possibility of each zombie computer sending a different message or employing stealth techniques to defeat spam filters."

Email bombing attacks can be defended against by the use of specialized "spam firewall" appliances that examine the email message envelope data and metadata and contents of each incoming email message prior to arrival to an email server or email inbox. Email identified as suspicious or originating from an undesirable source can then be routed to a spam folder or otherwise disposed. The "spam firewall" is easily overwhelmed by a large scale DDOS email bombing attack. An additional method to defend against DDOS email bombing is the recent implementation of standards such as Sender Policy Framework ("SPF") into DNS infrastructure. An SPF record is a TXT record that is part of a domain's DNS zone file. The TXT record specifies a list of authorized host names/IP addresses that mail can originate from for a given domain name.

However, in recent years, the scale of some DDOS attacks, both typical DDOS attacks and DDOS Email Bombing, has become unprecedentedly large and long in duration, overwhelming the capabilities and resources of the largest and most powerful firewalls and defense systems. Distributed email attacks ("DDOS Email Bombing"), originating from perhaps millions or billions of distinct compromised remote hosts, and directed against a targeted email account or email server, are particularly difficult to thwart using the aforementioned and other even current methods because the multitude of distinct source IP addresses and originating mail servers are difficult to identify and filter away, and due to the sheer volume and magnitude of attack data.

FIG. 1 is a simplified block diagram depicting an embodiment of the invention described herein. Clients 101, either legitimate or malicious, access a protected server 102 via a network, such as the public internet. A protected server 102 could be a web server, email server, application server, or any other type of server that can be accessed via the public internet or any other network.

In the embodiment of FIG. 1, traffic intended for the protected server 102, the Domain's Authoritative DNS servers 103, or public DNS servers 104 must first pass through DTAF Firewalls 105. Other embodiments are envisioned in which DTAF Firewalls 105 are placed only between a subset of these destinations.

Generally, a DTAF (DNS Traffic Analyzer and Firewall) is capable of analyzing data received from the internet, and optimizing a firewall based upon the analysis. For example, in some embodiments, DTAF Firewalls utilize DNS and application log archives and analysis of realtime logs to track and analyze visitors by IP address, subnet, and or those visitors' DNS servers.

Using the archived and realtime data, the DTAF can keep an updated, realtime ACL (access control list), which effectuates the diversion of traffic to the firewall or to routers. The realtime ACL can use a combination of white lists, black lists, and grey lists to dynamically maintain a list of accepted and rejected clients. The general application of firewalls and specialized routers to prevent or mitigate malicious attacks are well known to those of skill in the art.

In some embodiments, the DTAF is capable of using references and DNS look-ups to determine the DNS servers of visitors. Thus, the ACL can also maintain a list of allowed and denied DNS servers (or, a DNS-ACL). The DNS-ACL can then be fed back to routers and firewalls to block suspicious DNS sources.

In some embodiments, the DTAF Firewall is capable of allowing, blocking, or modifying DNS queries and/or reply data. Thus, using the DNS-ACL, the DTAF can allow or reject individual IP addresses or all addresses from a particular DNS server. It is further envisioned that gray-listed addresses or DNS servers could be wait-listed for further analysis, especially during times of unusually high traffic, such as during a DDOS attack.

In the embodiment of FIG. 1, the DTAF Firewalls 105 and the protected server 102 send traffic data 110, including realtime information and historic data regarding IP addresses or DNS servers, to the Central Master DTAF 106. The traffic data 110 can include a variety of information, including but not limited to date and time information, source IP address, request frequency, request patterns, and packet content data.

The Central Master DTAF 106 of FIG. 1 analyzes the traffic data 110 and derives an ACL, based upon a white-list that includes the likely legitimate (non-malicious) set of source IP addresses (or DNS servers). Additionally, or in the alternative, the ACL may contain a black list and/or grey list. The Central Master DTAF 106 can better perform the functions of individual DTAF Firewalls 105, because the Central Master DTAF 106 receives data from multiple sources, such as the protected server 106, the Domain's Authoritative DNS servers, the public DNS servers, and their respective DTAF Firewalls 105.

The Central Master DTAF 106 sends DTAF-ACL 111 to the DTAF Firewalls 105. The DTAF-ACL 111 can include information regarding clients, their DNS servers, or both. Regarding a DTAF-ACL 111 for DNS servers, the Central Master DTAF can derive this information by, for example, performing a reverse look-up to determine the relevant subnet and authoritative ISP for the client address, and finally the ISP's assigned and published DNS servers assigned to the client address. Once received by the DTAF Firewalls 105, the DNS DTAF-ACL 111 can be used to mitigate malicious traffic by denying server IP address lookup via controlling the lookup of the address of a protected server 102 by public DNS servers that are included in the DNS DTAF-ACL.

In the embodiment of FIG. 1, the Central Master DTAF 106 can create 112 new DNS servers to be used as the Domain's New Authoritative DNS Servers (or New DNS Servers) 103b. In other embodiments, this and other functions are performed by components other than the Central Master DTAF 106. In the FIG. 1 embodiment, the Central Master DTAF 106 generates a DNS zone file for the protected domain with given TTL (time to live) and TTR (time to refresh) values. The zone file is then propagated to the original set of the Domain's Authoritative DNS Servers 103.

Generally, TTL and TTR rates can be on the order of hours long, but it is envisioned that varying live and refresh rates, such as 1 hour, 45 minutes, 30 minutes, 10 minutes, 5 minutes, 1 minutes, 30 seconds, or less, can be utilized to optimize functionality of the system under a heavy DDOS attack.

By creating 113 the New DNS Servers 103b, the Central Master DTAF 106 can utilize DNS shifting to further mitigate potential damage from malicious clients. This can be performed in a number of ways. For example, before the TTL of the new DNS zone file expires, the Central Master DTAF can create 112 the New DNS Servers 103b and delegate the domain name to these New DNS Servers 103b. The original Authoritative DNS Servers 103 would continue to service requests that are directed to them (usually up to the duration time defined by TTL). The New DNS Servers 103b would receive DNS requests from newly refreshed DNS servers seeking the domain name. The New DNS Servers 103b will continue to receive requests up to their TTL for recently serviced DNS servers.

The process outlined above can be repeated many times, which would result in spreading DNS request traffic across the New DNS Servers 103b. In effect, creating 112 New DNS Servers 103b in this manner allows the diffusion of DNS request traffic over more authoritative DNS servers than is specified by the maximum number of authoritative DNS servers at the Internet Registry or Root.

Traffic distribution can be facilitated via DNS rotation and DNS caching. In FIG. 1, this is accomplished by the Central Master DTAF 106, which updates DNS zones by rotating 113 the Domain's Authoritative DNS Servers 103, 103b. In some embodiments, the Central Master DTAF 106 changes the authoritative DNS on a regular rapid basis, after time period T. DNS records would be maintained and changed on a regular basis T2, with a TTL and refresh values less than T. The Central Master DTAF would then rotate the authoritative DNS lists and DNS records.

In various embodiments, DNS shifting can work in a number of different ways using a variety of ACL's, white lists, black lists, and grey lists. For example, the Central Master DTAF 106 could publish its new DNS location to clients or DNS's on the white list. All other clients (new, grey-listed, etc.) could thus be blocked from accessing the server. Such an approach would be especially useful during DDOS attacks when sacrificing some legitimate clients is preferable to receiving the full force of the attack. In some embodiments, new, white-listed, and grey-listed clients (or DNS servers) may be partitioned such that preferred traffic can proceed normally, while more suspicious traffic can be spread out among a number of new DNS servers to diffuse the attack and increase the effectiveness of firewalls and specialized routers, or to focus additional analysis on suspicious clients.

Figure 2:
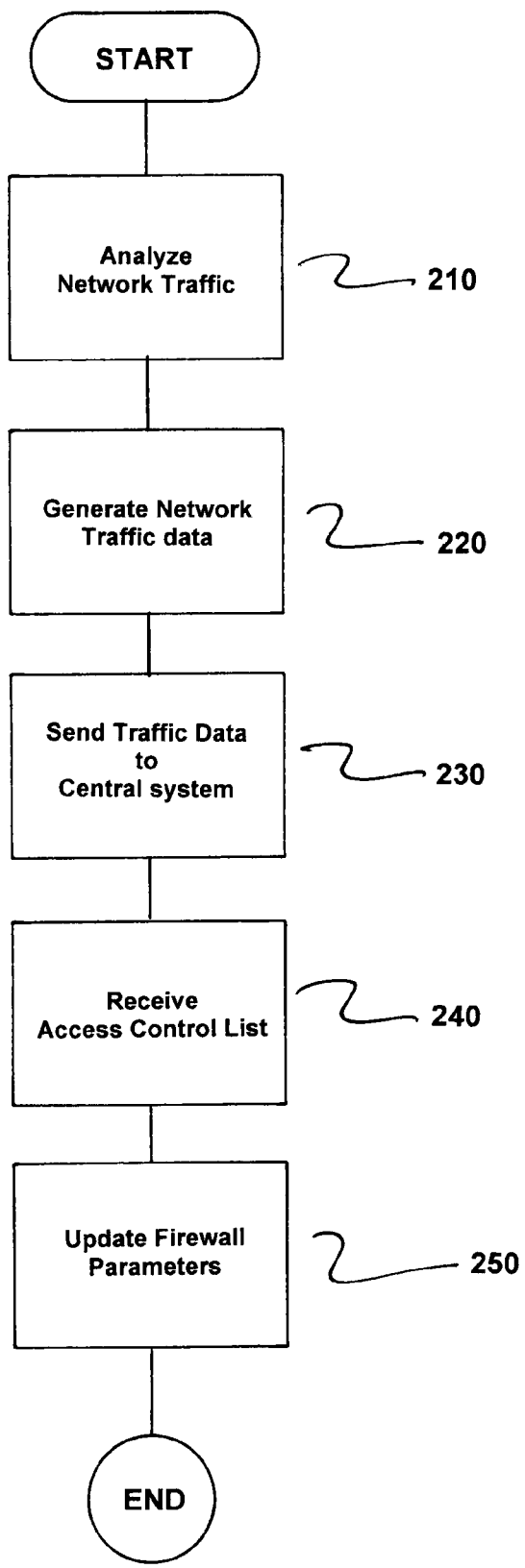
FIG. 2 is a flowchart of the method in accordance with an embodiment of the invention.

FIG. 2 is a flowchart of a method for mitigating malicious network traffic. The method comprises analyzing network traffic intended for at least one Authoritative Domain Name System (DNS) server, as indicated in step 210. Next, network traffic data is generated, as indicated in step 220. The network traffic data is then sent to a central system, as indicated in step 230. An access control list is now received from the central system, as indicated in step 240. Firewall parameters are then updated based upon the received access control list, as indicated in step 250, to allow or deny IP addresses, based on those identified in the access control list.

Figure 3:
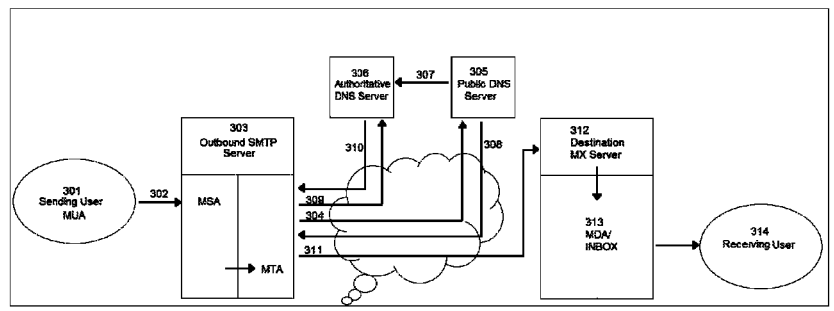
FIG. 3 is a flowchart of the typical email sending and delivery process.

FIG. 3 is a flowchart of the typical email sending and delivery process.

The typical simplified steps involved in sending any email message across the internet are as follows (see FIG. 3):

1. Sending user 301 composes an email message consisting of the addressee email address and the sender email address at a minimum.

2. The user's local email program MUA (mail user agent) is used to "send" the email message by connecting 302 to an MSA (mail submission agent) then to a MTA (mail transport agent) typically part of an outbound mail server 303, typically an outbound SMPT ("simple mail transport protocol") server.

3. The outbound SMPT server MTA reads the address email address (eg, "john.smith@example.com") and extracts the destination domain specification (eg, "example.com").

4. In order to determine the destination MX (mail exchange) Server 312 assigned to the destination email address, the MTA in the outbound SMTP server 303 makes a connection 304 to a DNS server 305 and performs a DNS lookup for the mail server ("MX record") associated with the destination domain. This DNS lookup is typically done by using the global internet and hierarchical DNS infrastructure to obtain the destination domain's assigned "MX" records (mail exchange server(s) record(s)).

5. if the DNS server 305 is not Authoritative for the destination domain, it will either (a) return a cached non-authoritative answer, or (b) determine the Authoritative DNS server 306 and connect to the Authoritative DNS server 307 performing a so-called "recursive lookup" of the DNS record and MX value(s) of the destination domain from the Authoritative DNS server 306 and return the results 308, or (c) it will NOT make a recursive connection 307 to the Authoritative DNS server and will not perform a recursive lookup but it will return the address(es) of the Authoritative DNS server(s) 308 to the requesting client 303, in which case the requesting client will make a connection to the Authoritative DNS server 309 and request return 310 of the DNS record and MX value(s) of the destination domain.

6. The outbound SMTP server then attempts to make a connection 311 across the internet to the destination domain's MX Server 312 using one of the standardized TCP/IP port addresses assigned for communications between SMTP servers (eg, TCP/UDP port 25, 465, etc).

Upon establishment of a connection 311 and successful negotiation of exchange protocol between the outbound SMTP server 303 and the destination MX server 312, the outbound SMTP server 303 transmits the email to the destination MX server. At this point, the outbound SMTP has completed its task. Any further email routing and delivery to the final recipient's inbox 313 is the task of the destination SMTP MX (mail exchange) Server 312 and any mail relay servers and MDA (mail delivery agent) further downstream. In the case of rejection of the email by the destination MX server 312, which could be for a variety of reasons, an appropriate rejection message is generated by the destination MX server 312 and returned to the outbound SMTP server 303, which is then typically returned to the sending user 301.

The receiving user 314 typically access the inbox messages 313 via an email client program.

The method used by this invention to mitigate malicious DDOS email bombing is to affecting step 4 above by denying the destination email address DNS information, or alternatively only its MX record information, from the sending user and outbound SMTP server using the methods disclosed herein.

In the embodiment of FIG. 1, the DTAF Firewalls 105 and the protected server (in this case, a protected DESTINATION MX SERVER) 102 send traffic data 110, including realtime information and historic data regarding IP addresses or DNS servers (which may include, IP addresses or hostnames from inbound attack email), to the Central Master DTAF 106. The traffic data 110 can include a variety of information, including but not limited to date and time information, source IP addresses, request frequency, request patterns, and packet content data, and outbound and relay SMTP email servers.

The Central Master DTAF 106 of FIG. 1 analyzes the traffic data and email relay data 110 and derives an ACL, based upon a white-list that includes the likely legitimate (non-malicious) set of source IP addresses (or DNS servers).

In certain embodiments the access control list contains a list of denied IP addresses that are prohibited from passing through to the protected system and allowed IP addresses that are allowed to pass through to the protected system. These allowed and denied IP addresses are based not only upon source address of the attack traffic, but also IP addresses belonging to public and private DNS servers and DNS resolvers identified as relied upon by the attacker(s) to find the target protected system. Accordingly, such identification is performed via an analysis of network traffic at the attack target as well and at distributed DTAF systems that are not under attack, such as public Internet Service Provider (ISP) DNS servers.

Therefore, in certain embodiments, wherein the IP addresses belonging to public and private DNS servers and DNS resolvers identified as relied upon by the attacker(s) to find the target protected system, are identified by a reverse lookup of the source IP address to determine the owner (ISP) of the IP address and network subnet of the source IP address. The ISP and source subnet information can then be used to lookup the default DNS servers assigned to the source IP by the ISP from an internal maintained database. Finally, to detect the use of non-default DNS servers by the attacker(s), such as open public DNS servers, an analysis of attack traffic, current authoritative DNS values and log files, and DTAF change history can be used to closely determine the non-default DNS server(s) used by that attacker.

Figure 4:
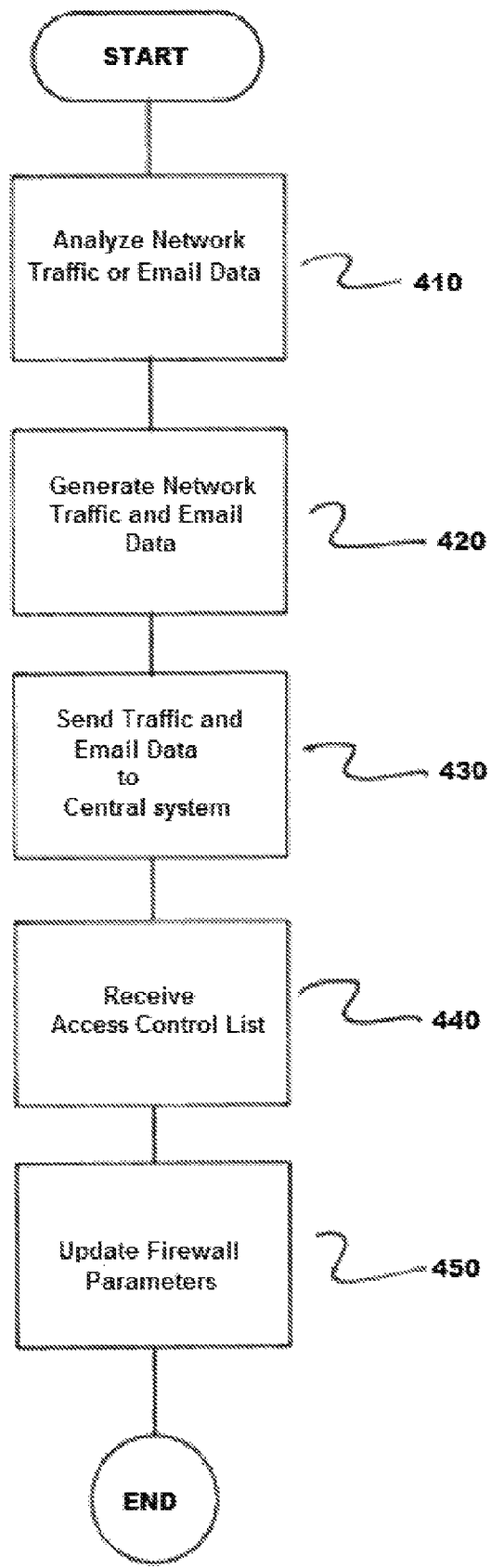
FIG. 4 is a flowchart of a method for mitigating malicious network traffic, specifically, a DDOS email bombing attack.

FIG. 4 builds upon FIG. 1 and further describes a method for specifically analyzing network traffic and email traffic intended for at least one email server, as indicated in step 410. Next, network traffic and email relay data is generated, as indicated in step 420. The network traffic and email relay data is then sent to a central system, as indicated in step 430. The central system performs an analysis of network traffic and email relay data and makes or updates an access control list. The access control list is now received from the central system, as indicated in step 440. Firewall parameters are then updated based upon the received access control list, as indicated in step 450. Therefore, the protected server is protected from malicious traffic and email traffic that is received by that server.

The invention being fully described, one of ordinary skill in the art can see how the interplay of client and DNS ACLs, DTAFs, DNS shifting, and Central Master DTAFs can be selectively combined to produce a number of flexible solutions depending on the financial, security, access, and control needs relating to a particular protected server.

The invention claimed is:

1. A system for mitigating malicious email traffic, comprising: a protected server within a domain or protected email server that receives network traffic, including email traffic; at least one Authoritative Domain Name System (DNS) server of the domain; at least one DNS Traffic Analyzer and Firewall (DTAF), wherein network traffic must pass through the at least one DTAF Firewall before accessing the at least one Authoritative DNS server, and wherein the at least one DTAF Firewall analyzes and collects data from the email traffic attempting to pass through the at least one DTAF Firewall to a protected server; and a Central Master DTAF, wherein the at least one DTAF Firewall sends email traffic data to the Central Master DTAF, and wherein the Central Master DTAF sends at least one access control list to the at least one DTAF Firewall.

2. The system of claim 1, wherein network traffic must also pass through the at least one DTAF Firewall before accessing the protected server.

3. The system of claim 1, wherein network traffic must also pass through the at least one DTAF Firewall before accessing public DNS servers.

4. The system of claim 1, wherein the at least one Authoritative DNS Server send network traffic data to the Central Master DTAF.

5. The system of claim 1, wherein the access control list(s) include information related to a specific DNS Server and wherein the at least one DTAF Firewall is capable of controlling or analyzing traffic originating from the specific DNS Server.

6. The system of claim 1, further comprising a domain shifting subsystem, wherein the domain shifting subsystem creates at least one New Authoritative DNS server and reroutes at least some network traffic to the at least one New Authoritative DNS server.

7. The system of claim 6, wherein the domain shifting subsystem rotates the at least one New Authoritative DNS Server on a regular basis.

8. The system of claim 6, wherein the at least one New Authoritative DNS server process new network traffic.

9. The system of claim 1, wherein the access control list contains a list of denied IP addresses that are prohibited from passing through to the protected system and allowed IP addresses that are allowed to pass through to the protected system, wherein such allowed and denied IP addresses are based not only upon source address of the attack traffic, but also IP addresses belonging to public and private DNS servers and DNS resolvers identified as relied upon by the attacker(s) to find the target protected system, such identification done via an analysis of network traffic at the attack target as well and at distributed DTAF systems that are not under attack, such as public Internet Service Provider (ISP) DNS servers.

10. The system of claim 9, wherein the IP addresses belonging to public and private DNS servers and DNS resolvers identified as relied upon by the attacker(s) to find the target protected system, are identified by a reverse lookup of the source IP address to determine the owner (ISP) of the IP address and network subnet of the source IP address; wherein, the ISP and source subnet information is used to lookup the default DNS servers assigned to the source IP by the ISP from an internal maintained database; and wherein the detection of the use of non-default DNS servers by the attacker(s), such as open public DNS servers, an analysis of attack traffic, current authoritative DNS values and log files, and DTAF change history, is used to determine the non-default DNS server(s) used by that attacker.

11. The system of claim 1, wherein the access control list contains a list of denied IP addresses that are prohibited from passing through to the protected system and allowed IP addresses that are allowed to pass through to the protected system, wherein such allowed and denied IP addresses are based not only upon source address of the attack traffic, but also IP addresses belonging to public and private EMAIL SERVERS and EMAIL RELAY SERVERS identified as used by the EMAIL attacker(s) to find the target protected system or related mail exchange (MX) servers, such identification done via an analysis of network traffic at the attack target, attack target EMAIL server, as well and at distributed DTAF systems that are not under attack, such as public Internet Service Provider (ISP) DNS servers.

12. The system of claim 1, wherein the access control list contains a list of restricted IP addresses that are dynamically and selectively allowed to pass through to the protected system based upon list of allowed or disallowed query type, wherein such allowed and denied IP addresses are based not only upon source address of the attack traffic, but also IP addresses belonging to public and private EMAIL SERVERS and EMAIL RELAY SERVERS identified as used by the EMAIL attacker(s) to find the target protected system or related mail exchange (MX) servers, such identification done via an analysis of network traffic at the attack target, attack target EMAIL server, as well and at distributed DTAF systems that are not under attack, such as public Internet Service Provider (ISP) DNS servers.

13. A method for mitigating malicious network traffic, comprising the following steps:
analyzing network traffic intended for at least one Authoritative Domain Name System (DNS) server or email server;
generating network traffic and email relay data;
sending the network traffic and email relay data to a Central Master DTAF central system;
receiving an access control list from the Central Master DTAF central system; and
updating firewall parameters based upon the received access control list:
creating at least one New Authoritative DNS server; and
routing at least some of the network traffic to the at least one New Authoritative DNS server.

14. The method of claim 13, further comprising the following step:
rotating the Authoritative DNS servers on a regular basis.

15. The method of claim 13, further comprising the following steps:
generating an access control list of denied IP addresses; and denying access to the protected server for an IP address on the access control list.

* * * * *